Oct. 28, 1958 HIROICHI KIMURA ET AL 2,858,443
PERMANENT MAGNET LENS AND LENS SYSTEM
Filed May 20, 1955 3 Sheets-Sheet 1

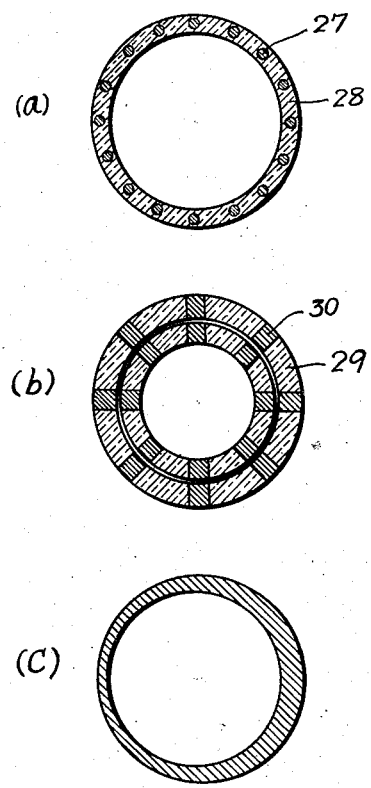
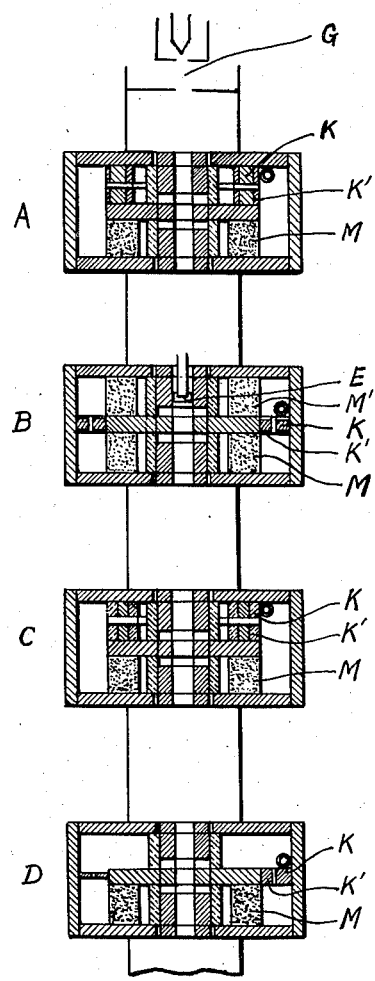

United States Patent Office 2,858,443
Patented Oct. 28, 1958

2,858,443

PERMANENT MAGNET LENS AND LENS SYSTEM

Hiroichi Kimura, Bunya Tadano, and Nozomu Morito, Tokyo City, Japan, assignors to Hitachi Limited, Tokyo, Japan Application May 20, 1955, Serial No. 509,958

Claims priority, application Japan September 15, 1954

3 Claims. (Cl. 250—49.5)

This invention relates to permanent magnet lens systems to be used for electron microscopes and similar devices, and more particularly to devices for changing focal length over a wide range.

It has been generally recognized that in electron microscopes and similar devices, the use of permanent magnets for the excitation of electron lenses has the advantage that a high resolving power is obtained due to the stability of the permanent magnet, and the further advantage of easier maintenance. On the other hand, resulting stray magnetic fields in such electron optical systems, cause distortion and the deflection of images. Thus if in an electron lens system with exciting coils the coils are simply replaced by permanent magnets, there occur stray magnetic fields which will greatly affect performance. Though the stray magnetic field can be reduced to a certain extent by means of shielding, this results in poor design in practice. Various schemes have heretofore been proposed for eliminating stray magnetic fields in electron lens systems excited by permanent magnets. However, all of proposals showed, due to fixed focal length, the difficulties in focusing and magnification change. Such disadvantages are obviated by the electron microscope. Such disadvantages can be obviated by the present invention.

A principal object of this invention is thus to provide an improved electron lens system for electron microscopes or other similar devices using permanent magnets instead of exciting coils, which system facilitates focusing, permits variable magnification over a wide range and obtaining diffraction patterns from limited areas similar to those obtainable with heretofore known lens systems, without necessitating the use of lens current supply but facilitating maintenance and giving high resolving power.

Reference is next made to the accompanying drawings in which

Fig. 5 is a sectional view of a four stage permanent magnet electron lens system embodying the invention;

Figure 7:
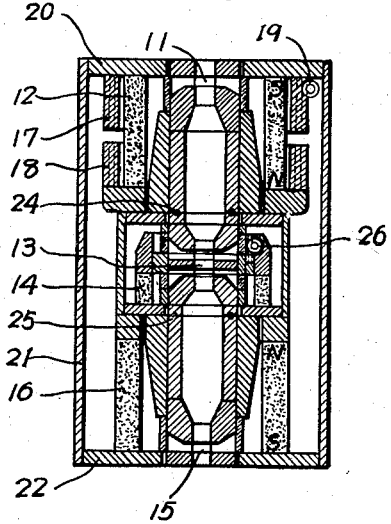
Fig. 7 is a sectional view of a lens system in accordance with a further embodiment of the invention.
Figure 8:
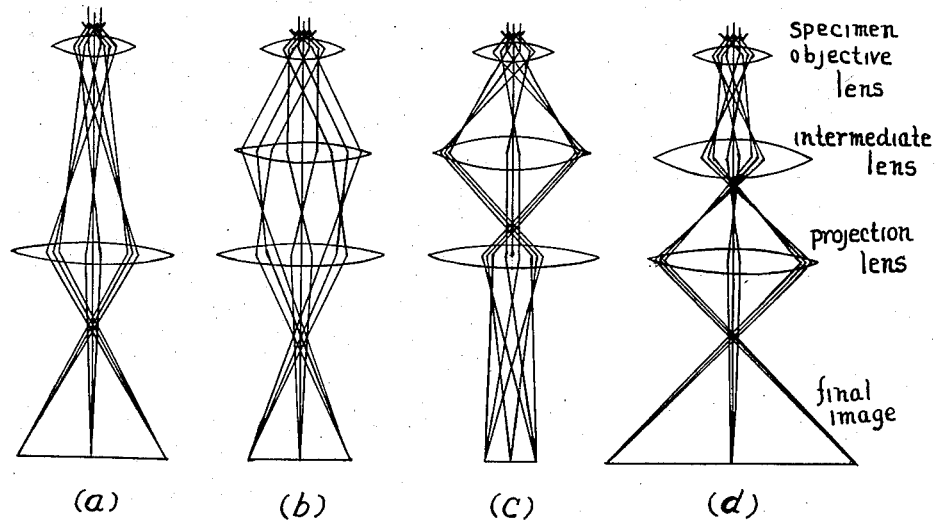

Figs. 8a, b, c and d show different electron paths in the lens system shown in Fig. 7; and Figs. 9a, b and c show sectional views of adjusting rings used in accordance with the invention.

Figure 1:
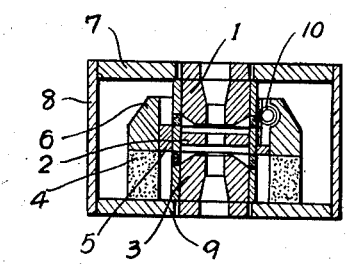
Fig. 1 is a sectional view showing a construction of a magnetic lens with three pole pieces excited by permanent magnets in accordance with one embodiment of the invention.

In Fig. 1, three pole pieces 1, 2 and 3 constitute a lens. The central pole piece 2 is secured in position on one end of a permanent magnet 4 by means of a movable yoke 5 and a fixed yoke 6, and pole pieces 1 and 3 are secured to the other pole of the permanent magnet 4 through a yoke 7 and member 8, and yoke 9, respectively.

Figure 2:
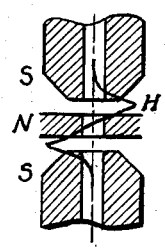
Fig. 2 is a sectional view of the pole pieces illustrating field distribution.
Figure 3:
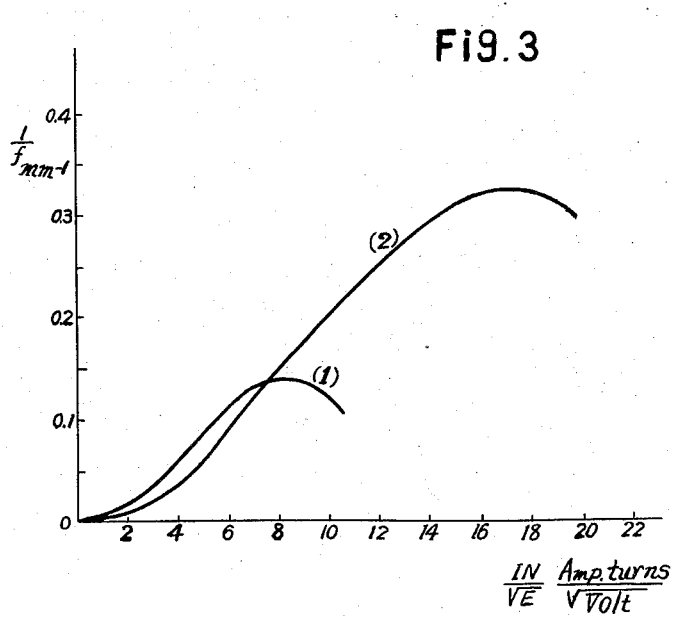
Fig. 3 shows curves illustrating the relation between $IN/\sqrt{E}$ and focal length.

The field distribution of the lens shown in Fig. 1 is as shown by the curve H in Fig. 2. With magneto-motive force being IN, and the electron accelerating voltage being E, the relation between the value of $IN/\sqrt{E}$ and the focal length is as shown by curve 1 in Fig. 3. When the magneto-motive force is very weak the focal length becomes equal to almost one-half of that of conventional magnetic lens systems with two pole pieces of the same diameter as shown by curve 2 in Fig. 3. As the magneto-motive force becomes stronger, the difference of the focal length for both devices becomes smaller so that the minimum focal length is obtained at a comparatively weak magneto-motive force.

Figure 4:
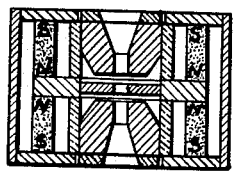
Fig. 4 is a sectional view of a magnetic lens with three pole pieces in accordance with another embodiment of the invention.

Two gaps in a magnetic lens system with three pole pieces can be excited respectively by means of two separate permanent magnets as shown in Fig. 4. In this case, the permanent magnets are so arranged that their like poles (poles of the same polarity) are connected through a yoke.

The foregoing description is concerned with magnetic lens system having three pole pieces and of a fixed focal length. Now, if the movable yoke 5, connecting the central pole piece 2 and the fixed yoke 6, is shifted on the axis of the device by means of the gear mechanism 10 in Fig. 1 so that the permeance seen from the ends of the permanent magnet is increased, the working point of the permanent magnet will be shifted along a minor hysteresis loop of the associated magnetization curve and this can be considered to be practically reversible without demagnetization for a good magnetic steel and focal length can be changed to a great extent in a manner similar to that of an electron lens system excited by coils.

An electron lens having three pole pieces excited by a permanent magnet, constructed as above described, has advantages in that there are no stray fields and focal length can be changed to a large extent. This is more advantageously applied to the case in which the magneto-motive force is comparatively weak. Accordingly, the principle is well adapted for use with a condenser lens or as an intermediate lens which is arranged between an objective lens and a projection lens.

If two, three or four sets of such lenses with three pole pieces are combined to build up two, three or four stage electron lens system as shown in Fig. 5, it is possible to obtain not only variable magnification, but also a diffraction pattern from a limited area of a specimen in the object stage of an electron microscope.

In the electron lens system shown in Fig. 5, a plurality of permanent magnet electron lenses each having three pole pieces with two gaps and excited by one or two permanent magnets M, or M and M' are arranged in four stages, wherein the lens A is used as a condenser, B as an objective, C as an intermediate and D as a projection lens. G and E are the electron gun and a specimen respectively. Such a system has the advantages that no stray field emanates to the outside even if any one lens is used individually and that the magneto-motive force of one lens can be readily changed without affecting the other lenses. Moreover, in an electron lens with three pole pieces, the coefficient of chromatic difference in rotation can be reduced to zero or nearly zero irrespective of the variation of magneto-motive force if the arrangement of pole pieces is made almost symmetrically about the central pole piece. The electron lens with three pole pieces, as apparent from the curve illustrating the relation between the focal length and magneto-motive force, has characteristics whereby shortest focal length occurs when the magneto-motive force is comparatively weak.

Figure 6:
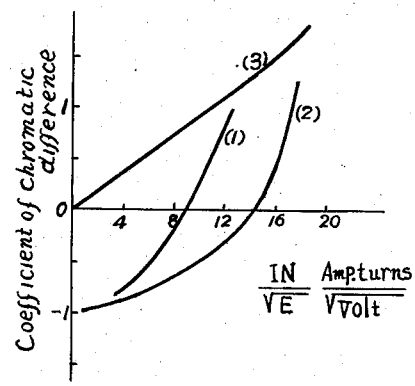
Fig. 6 shows curves for illustrating the relation between the coefficients of chromatic field aberration and magneto-motive force.

The relation between the coefficient of chromatic difference in magnification and the magneto-motive force is shown by way of example in Fig. 6, wherein the curve 1 represents an example of the coefficient of chromatic difference in magnification when the electron lens with three pole pieces is used as a projection lens. Curves 2 and 3 show the coefficient of chromatic difference in magnification and the coefficient of chromatic difference in rotation, respectively, when an ordinary electron lens with two pole pieces is used as a projection lens. In Fig. 6, the ratio of magneto-motive force IN to the square root of electron accelerating voltage E, that is, $IN/\sqrt{E}$ is the basis of the abscissa. It will be apparent from Fig. 6 that the coefficient of chromatic difference in magnification becomes zero when the magneto-motive force is comparatively weak. Similar results can be obtained when said lens is used as an objective lens. Thus, the decrease of resolution due to the fluctuation of electron accelerating voltage can be reduced if the electron lens with three pole pieces is used as an objective and also as a projector by selecting an amount of magneto-motive force corresponding to zero or nearly zero of the coefficient of chromatic difference in magnification so as to construct a two stage electron lens system. Moreover, it is possible to construct a three stage electron lens system with compensated chromatic field aberration by using a three pole piece lens as an intermediate lens.

Fig. 7 illustrates a three stage electron lens system of the invention when an electron lens with three pole pieces as shown in Fig. 1 is used as an intermediate lens and permanent magnet lenses are used as an objective lens and a projection lens. The objective lens 11 is excited by a permanent magnet 12 and the projection lens 15 by a permanent magnet 16, an intermediate electron lens 13 with three pole pieces which is located between lenses 11 and 15 being excited by a permanent magnet 14, and its magneto-motive force being adjusted by a gear mechanism 26 similar to that described above. If, in such a three stage electron lens system, the permanent magnet 14 makes a short-circuit so that the intermediate lens does not act as a lens, this electron lens system will exhibit a final image which is magnified in two stages by the objective lens 11 and the projection lens 15. In this case, the electron paths are as shown in Fig. 8a. If the lens action of the intermediate lens is gradually increased by means of the adjusting mechanism 26, the total magnification decreases. It passes through a minimum, at which the diffraction pattern from a limited area of the specimen in the object stage of the electron microscope is obtained, and then increases again. The electron paths in these cases are shown in Figs. 8b, c and d. Even if the lens actions of the objective lens and the projection lens are kept constant, the magnification of the final image is changed as the lens action of the intermediate lens is varied and, particularly in the case of Fig. 8c, the diffraction pattern from a limited area is obtained. Thus, the lens system has the advantage of having entirely no effect on the magneto-motive forces of the objective and projection lenses by changing the magnification.

When an electron lens with three pole pieces is used as an intermediate lens as above described, a three stage lens system can be constructed by exciting the objective lens 11 and the projection lens 15 in parallel by means of the permanent magnet 12 or 16 only. In this case the lens action is entirely same as above explained.

For focusing the objective lens, a set of rings 17 and 18 (Fig. 7) may be used. The ring 18 is fixed, while the ring 17 is rotated by the gear 19. The cross sections of these rings are shown in Fig. 9a, wherein ferromagnetic pieces 27 are embedded in a non-magnetic ring 28 in such manner that when the ferromagnetic pieces in two rings are brought to coincide with each other, the stray fluxes are at a maximum and the working point on the demagnetization curve of the permanent magnet is shifted on the minor hysteresis loop towards the larger permeance coefficient so that the magneto-motive force is reduced and the focal length of the objective lens is increased. On the other hand, if the ferromagnetic pieces are in staggered relation, the stray fluxes are at a minimum and the focal length is shortened. A set of non-magnetic rings having ferromagnetic pieces can be arranged concentrically as shown in Fig. 9b. If the rings 17 and 18 are made of ferromagnetic bodies having non-uniform cross section as shown in Fig. 9c, the same regulation can be effected. In any of the above cases, the shifting of the working point on the demagnetization curve of the permanent magnet is substantially reversible for good magnetic steel and the magnet is never demagnetized. The magnitude of shifting of the working point is determined by the range of variation of focal length and the cross sectional area and gap of the ferromagnetic pieces are accordingly determined. In general, it is desirable to provide rough and fine adjusting devices. In Fig. 5, K and K' are the focal length adjusting mechanisms similar to those explained above.

There will now be obvious to those skilled in the art many modifications and variations of the structures set forth, which do not depart essentially from the spirit of the invention as defined in the following claims.

What we claim is:

1. A three-stage permanent magnet electron lens system with two lenses comprising two pole pieces, two permanent magnets positioned with like poles aligned, said magnets being positioned for exciting said pole pieces and constituting therewith an objective lens and a projection lens, a focusing device concentrically and operatively associated with one of said magnets for controlling said objective lens, an outside shield cylinder arranged to connect the like poles of said two permanent magnets, and an intermediate lens system between said objective and projection lenses; said intermediate lens system comprising a double gap lens including three aligned pole pieces, a permanent magnet exciting said gaps in parallel, means operatively associated with said intermediate lens system for adjusting the magneto-motive force of said intermediate lens system, and a cylindrical yoke connecting the two outer pole pieces of said double gap lens.

2. A three-stage permanent magnet electron lens system according to claim 1 wherein the means for adjusting the magneto-motive force of said intermediate lens system comprises a fixed yoke and a movable yoke located between the central pole piece of said lens system and said fixed yoke, said fixed yoke being connected to a pole of one of said permanent magnets, and a gear mechanism for shifting said movable yoke in parallel to the optical axis for changing the focal length.

3. A three-stage permanent magnet electron lens system according to claim 2 wherein said focusing device includes two non-magnetic circular rings, and ferromagnetic pieces embedded in said rings and concentric with the permanent magnet exciting the objective lens and said gear mechanism whereby one of said rings is turned relatively to the other for regulating the stray flux for focusing.

References Cited in the file of this patent

UNITED STATES PATENTS

| 2,305,761 | Borries et al. | Dec. 22, 1942 |
| 2,369,796 | Ramberg | Feb. 20, 1945 |
| 2,503,173 | Reisner | Apr. 4, 1950 |
| 2,714,678 | Wolff | Aug. 2, 1955 |